Patented July 8, 1941

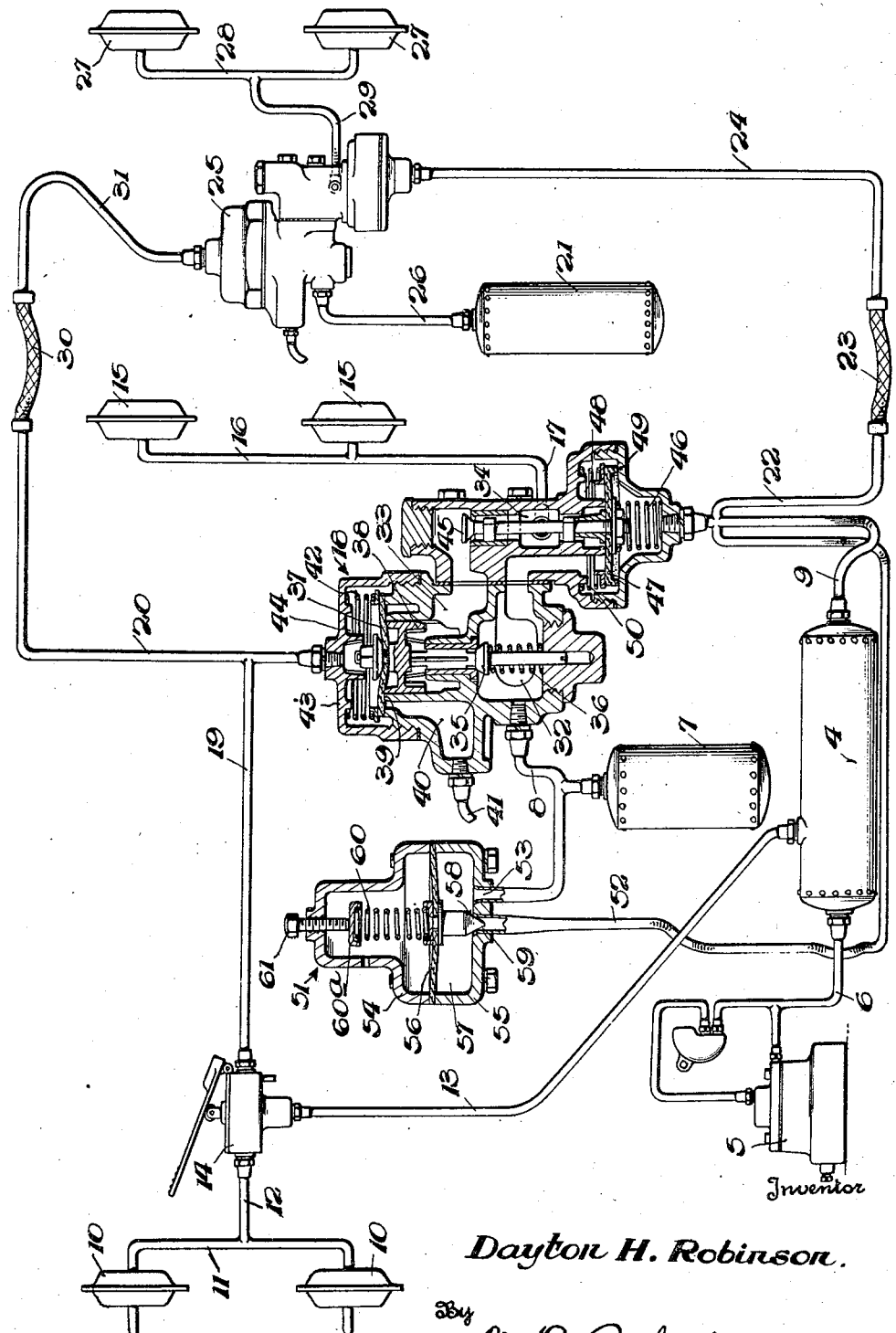

2,248,437

UNITED STATES PATENT OFFICE 2,248,437

BRAKE MECHANISM

Dayton H. Robinson, Pittsburgh, Pa., assignor to Bendix-Westinghouse Automotive Air Brake Company, Pittsburgh, Pa., a corporation of Delaware Application February 1, 1940, Serial No. 316,822

17 Claims. (Cl. 303—26)

This invention relates to a controlling mechanism for vehicle brakes, and more particularly to automatic control mechanism for brakes of the fluid pressure type.

Various mechanism and arrangements have been heretofore proposed for automatically effecting an application of vehicle brakes of the fluid pressure type in the event of loss of pressure from some parts of the system, and such mechanisms have been particularly adapted to use with tractor trailer trains. In certain of the prior apparatus, however, difficulty has sometimes been experienced due to the fact that the automatic application of the brakes on the tractor tended to occur prior to a similar application of the brakes on the trailer, with a resulting tendency for the trailer to overrun the tractor and skid to one side or the other on the highway. Accordingly, it is an object of the present invention to provide automatic control mechanism for systems of this kind, adapted to prevent this undesirable action from occurring.

A further object of the present invention is to provide an automatically operable arrangement for equalizing the pressures in various parts of the system under certain conditions of operation.

Yet another object of the invention is to provide a novel automatically operable construction for minimizing the effects of leakage from certain parts of a fluid pressure brake system upon operation thereof.

Other objects and novel features of the invention will appear more fully hereinafter from the following detailed description when taken in connection with the accompanying drawing wherein one embodiment of the invention is illustrated. It is to be expressly understood, however, that the drawing is employed for purposes of illustration only and is not designed as a definition of the limits of the invention, reference being had for this purpose to the appended claims.

The single figure of the drawing is a diagrammatic view, partially in section, illustrating a fluid pressure brake system for a tractor and trailer constructed in accordance with the principles of the present invention.

In the drawing, the present invention is illustrated as being applied to a tractor and trailer train, the mechanism on the tractor including a main reservoir 4, adapted to receive fluid pressure from a suitable compressor 5 through a conduit 6, as well as an auxiliary reservoir 7 connected to the main reservoir by means of conduits 8 and 9. A pair of front brake actuators 10 are provided which are connected to the main reservoir by means of conduits 11, 12 and 13, a brake valve 14, which may be constructed in accordance with the patent to William J. Andres and Roy S. Sanford, No. 2,133,275, granted October 18, 1938, for Control mechanism, being adapted to control the connection between conduits 12 and 13. A pair of rear brake actuators 15 are also provided on the tractor and are adapted to be connected with the auxiliary reservoir through conduits 16, 17 and 8. A combined relay emergency valve 18, which may be constructed in accordance with the disclosure of the patent to Stephen Johnson, Jr., No. 2,018,212, granted October 22, 1935, for Brake mechanism, serves to control the connection between conduits 8 and 17, as well as the connection between conduits 8 and 9, and control of the relay valve portion is effected by fluid pressure from the brake valve 14 supplied to the relay valve through conduits 19 and 20, as will be more fully described hereinafter.

The trailer is provided with a reservoir 21 adapted to be supplied with fluid pressure from the main reservoir 4 through conduits 9 and 22, flexible hose 23, conduit 24 and a combined relay emergency valve 25 constructed in the same manner as relay emergency valve 18, the valve 25 being connected to the trailer reservoir 21, through a conduit 26. A pair of trailer brake actuators 27 are connected to relay emergency valve 25 through conduits 28 and 29 and the relay portion of the valve 25 is controlled by fluid pressure supplied from the brake valve 14 in the same manner as valve 18 by virtue of its connection with the brake valve through conduits 19 and 20, flexible hose 30, and conduit 31, it being readily apparent that the actuators 10 are under the direct control of the brake valve 14, while the rear tractor actuators 15 and the trailer brake actuators 27 are supplied with fluid pressure from reservoirs 7 and 21 respectively, due to the control exercised on the relay valves 18 and 25 by the operation of the brake valve.

With particular reference to the valve 18 as shown on the drawing, it will be noted that the same is provided with an inlet chamber 32, supplied with fluid under pressure from the auxiliary reservoir through conduit 8, and with an outlet chamber 33 connected with the brake actuators 15 through a passage 34 in the body of the valve and conduits 17 and 16. The inlet and outlet chambers are separated by means of a valve 35 normally held in closed position by spring 36 and adapted to be moved downwardly to open position by means of a diaphragm 37 mounted in the upper portion of the casing, and acting on the intake valve stem through the medium of a piston-like guide member 38. The diaphragm is held against an annular exhaust port 39 connected with atmosphere through an exhaust chamber 40 and an exhaust conduit 41, by means of a spring 42 interposed between the diaphragm and the cover member 43, the cover member forming in cooperation with the diaphragm, a control chamber 44 which is connected with the brake valve 14 through conduits 20 and 19. It will be apparent from the foregoing description that operation of the brake valve 14 to supply fluid pressure from main reservoir 4 to the control chamber 44 through conduits 13, 19 and 20, will move the diaphragm downwardly at its central portion, opening the intake valve 35 and connecting the auxiliary reservoir with the brake actuators 15 through conduit 8, inlet chamber 32, past open valve 35, outlet chamber 33, passage 34 and conduits 17 and 16. Since the trailer relay emergency valve 25 is constructed in the same manner, it is obvious that when fluid pressure is supplied from the brake valve to the relay valve 18, through conduits 19 and 20, this fluid under pressure will also be supplied to the trailer relay valve through conduits 20, flexible hose 30, and conduit 31, thus actuating the trailer relay valve to establish a connection between the trailer reservoir 21 and the trailer brake actuators 27, through conduit 26, the relay emergency valve, and conduits 29 and 28.

As heretofore stated, it is customary in brake systems of this type to provide means for automatically applying the brakes of the vehicles on a failure or reduction of pressure in certain parts of the system, and in this particular case, the passage 34 of the relay emergency valve is provided with a valve 45, adapted on downward movement to close the upper end of the passage. Valve 45 is normally held in open position by means of a spring 46 interposed between the lower portion of the valve casing and a diaphragm 47 carried by the stem of the valve 45, the diaphragm thus normally resting against the lower end of the passage 34 to prevent communication between this passage and a chamber 48, which chamber forms an extension in the casing of inlet chamber 32. The outer edge of the diaphragm is normally seated against an annular surface 49 of the casing by means of a spring 50 interposed between the casing and the upper surface of the diaphragm, this mounting of the diaphragm serving to permit the flow of fluid pressure from conduit 9 to chamber 48 and thence to the auxiliary reservoir through inlet chamber 32 and conduit 8, but preventing the flow of fluid pressure in the reverse direction. Thus, when the pressure in conduit 9 is reduced below that existing in the auxiliary reservoir 7 due to leakage in some portion of the system, a pressure differential will be created across the diaphragm 47, and when this pressure differential is sufficient to overcome the upward force of the spring 46, the diaphragm will move downwardly, closing the valve 45 and moving the central portion of the diaphragm away from the lower end of the passage 34 to permit communication between the auxiliary reservoir 7 and the brake actuators 15 through conduit 8, inlet chamber 32, chamber 48, passage 34 and conduits 17 and 16, thus effecting an emergency application of the brake. Since the valve 45 closes as the lower end of the passage 34 is placed in communication with the chamber 48, the fluid pressure applied to brake actuators 15 through passage 34 is prevented from escaping to atmosphere past the valve 45, through outlet chamber 33, past exhaust valve seat 39, and through chamber 40 and conduit 41. The mode of operation of the emergency valve mechanism on the trailer is identical with that described in connection with the relay emergency valve 18, and it will be understood that a reduction in pressure in the main reservoir 4, or its connected conduits, sufficient to actuate the emergency valve mechanism on the tractor will, in like manner, tend to actuate the emergency valve mechanism on the trailer to supply fluid pressure from the trailer reservoir 21 to the trailer brake actuators 27.

It will be noted, however, that due to the fact that the main reservoir 4 must supply fluid pressure to the reservoirs 7 and 21 on the tractor and trailer respectively, as well as to the brake valve 14 for actuating the valves 18 and 25 and to the front tractor brake actuators 10, it is possible for a rapid drop in pressure to occur in the main reservoir as well as in the conduit 9, which is sufficient to actuate the emergency portion of the valve 18 prior to the similar actuation of the emergency portion of valve 25, particularly in view of the fact that the conduits leading from the conduit 9 to the trailer emergency valve are of considerable length. In order that this action may be prevented, means are provided in the present invention for equalizing the pressures between the reservoirs 4 and 7 under normal operating conditions.

In further explanation of the above described action, it should be pointed out that emergency valves of the type commonly used, require a pressure differential of possibly ten pounds per square inch for their operation, with the result that the pressure in the main reservoir 4 can drop below that in the auxiliary reservoir 7 by approximately ten pounds without actuating the diaphragm 47 to connect the auxiliary reservoir 7 with the brake actuators 15. This condition may occur under normal operation without the knowledge of the operator when the vehicles are traveling along the road, and a sudden operation of the brake valve 14 to apply the brakes under this condition may be sufficient to cause an immediate operation of the tractor emergency valve portion to apply the tractor brakes before such pressure drop can be transmitted to the trailer emergency valve to cause a similar trailer emergency brake application, with the result that the tractor brakes are applied ahead of those on the trailer with a consequent tendency for the trailer to skid to one side of the road or the other. In order to prevent this tendency, a pressure responsive valve 51 is interposed between the outlet conduit 9 of the main reservoir and conduit 8 of the auxiliary reservoir 7, the valve being connected to conduit 9 by means of a conduit 52 and to the auxiliary reservoir conduit 8 by means of a conduit 53. As illustrated, the valve 51 is provided with upper and lower casing members 54 and 55, with a diaphragm 56 clamped between the two members in such a manner as to form a fluid pressure chamber 57 between the diaphragm and the lower portion of the casing. A valve member 58 is carried by the diaphragm and is normally pressed downwardly to close an outlet port 59 formed in the casing member 55 as by means of a spring 60 interposed between the upper surface of the diaphragm and a spring seat 60a abutting an adjustable screw 61 carried by the housing member 54.

In fluid pressure brake systems of the present type, a minimum operating pressure of seventy pounds per square inch, for example, is considered necessary to provide adequate braking under all conditions, while in order that a sufficient reserve supply of fluid pressure may be available, the pressure in the main reservoir, as well as in the other reservoirs of the system, is maintained at a considerably higher value. This being the case, the spring 60 of the valve 51 is so adjusted that the valve 58 remains in closed position until the pressure in the auxiliary reservoir 7 exceeds the predetermined minimum pressure necessary for safe operation of the brakes, it being apparent that when the pressure in the auxiliary reservoir exceeds this value, the pressure will be sufficient to overcome the force of the spring 60 and force the diaphragm 56 upwardly to open the valve 58 and establish a connection between conduits 53 and 52. Thus, no pressure differential of appreciable value can occur between the main reservoir and the auxiliary reservoir during normal operation of the brake system. If, for example, the valve mechanism 51 is adjusted to connect the conduits 52 and 53 when the pressure in the auxiliary reservoir exceeds seventy pounds per square inch, and the braking system is normally operated with ninety pounds per square inch in all of the reservoirs, it will be evident that reservoirs 4 and 7 will be directly connected at all pressures above seventy pounds per square inch, but that trailer reservoir 21 will not be so connected with the main reservoir. Hence, a drop of pressure of ten pounds per square inch or more in conduit 9, which is connected to the trailer reservoir through the trailer emergency valve, will be sufficient to operate the trailer emergency valve to apply the trailer brakes without effecting operation of the tractor emergency valve to apply the tractor brake until a further drop in pressure occurs in conduit 9 and in the main reservoir. From the foregoing, it will be seen that through the equalizing action of the valve 51, a sequential emergency application of the brakes on the trailer and tractor respectively is assured at all operating pressures in the reservoirs above the safe minimum of seventy pounds per square inch, it being pointed out that breakage of any of the conduits attached to the main reservoir to a degree sufficient to jeopardize the operation of the entire system and reduce the pressure in reservoir 4 to seventy pounds per square inch or less, will serve to operate the emergency valve on the tractor almost immediately after the operation of the similar trailer emergency valve and apply the brakes on the tractor as well.

A further novel feature of the present system resides in the connection of conduits 52, 22 and 9 at a point adjacent to the connection of conduit 9 to the tractor emergency valve, it being apparent that if the portion of conduit 9 between the emergency valve on the tractor and the junction of conduits 22 and 52 therewith were of considerable length, a break in conduit 9 between the emergency valve and the junction would result in an immediate operation of the tractor emergency valve to apply the tractor brakes, while at the same time fluid pressure flowing from the main reservoir 4 through conduit 9 toward the junction, as well as fluid pressure flowing from the valve 51 toward the junction, through conduit 52, would tend to maintain the pressure at the junction and in the conduit 21, thus preventing an immediate application of the trailer brakes as is desired. With the conduits connected at the junction as shown, however, it is apparent that on breakage of the conduit 9 between the junction and the reservoir 4, fluid pressure will flow through the conduit 52 from the valve 51 to prevent a sudden drop of pressure below the emergency valve diaphragm on the tractor until such time as the valve 51 acts to cut off communication between conduits 52 and 53, it being pointed out that the pressure drop which occurs during this period will also be communicated to conduit 22 and will be sufficient to actuate the trailer emergency valve to apply the trailer brakes prior to the closing of the valve 51. In like manner, breakage of the conduit 52 will result in a flow of fluid pressure from the main reservoir 4 through conduit 9 to maintain the pressure at the junction and prevent actuation of the tractor emergency valve ahead of the similar valve on the trailer.

There has thus been provided by the present invention a fluid pressure braking system adapted to automatically apply the brakes on failure of the main fluid pressure supply, together with simple and automatic valvular means for insuring sequential application of the brakes by the operation of the automatic valves on the trailer and tractor respectively, and including novel connections of the various conduits connecting the different valves so constituted as to insure that the automatic valvular means will accomplish the desired result. The aforesaid desirable sequential operation of the brakes, when controlled by operation of the emergency valves, has been obtained by providing for equalization of the pressures between the reservoirs on the tractor at any pressure above that necessary for adequate operation of the brakes, but as soon as this pressure drops to the minimum necessary for safe operation, the valve mechanism 51 acts to automatically close the connection between the main and auxiliary reservoirs on the tractor, thus preventing further loss of pressure from the auxiliary reservoir through leakage of the main reservoir system and insuring an adequate supply of fluid pressure to the actuators 15 on the tractor on subsequent operation of the tractor emergency valve to connect the auxiliary reservoir with these actuators.

While one embodiment of the invention has been illustrated and described herein with considerable particularity, it is to be understood that the same is not limited thereto, but may be embodied in various forms, as will now be readily understood by those skilled in the art. Reference will, therefore, be had to the appended claims for a definition of the limits of the invention.

What is claimed is:

1. The combination with a fluid pressure brake system of the type having fluid pressure brake actuators, a pair of fluid pressure reservoirs, manually controlled valvular means for controlling the flow of fluid pressure from the reservoirs to the brake actuators, and valvular means responsive to a pressure differential between said reservoirs for connecting one of said reservoirs with the brake actuators independently of the operation of the manually controlled valvular means, of means for normally preventing the operation of said second named valvular means including valvular means responsive to the pressure in one of the reservoirs for establishing a connection between said one reservoir and the other reservoir when the pressure in said one reservoir exceeds a predetermined value.

2. The combination with a fluid pressure brake system of the type having fluid pressure brake actuators, a pair of fluid pressure reservoirs, means including manually controlled valvular means for controlling the flow of fluid pressure from the reservoirs to the brake actuators, and emergency valve means including a member responsive to the pressures in said reservoirs for supplying fluid pressure from said one of said reservoirs to the brake actuators independently of the operation of the manually controlled valvular means when the pressure in said one reservoir is substantially greater than that in the other reservoir, of means for establishing a direct connection between said reservoirs including valve mechanism responsive to the pressure in said one reservoir for effecting said connection when the pressure in said reservoirs exceeds a predetermined amount, whereby the pressures in said reservoirs are equalized and the occurrence of a pressure differential between the reservoirs for operating said emergency valve means is prevented.

3. In a fluid pressure brake system for a vehicle having fluid pressure brake actuators, a pair of fluid pressure reservoirs, means including manually controlled valvular means for controlling the flow of fluid pressure from the reservoirs to the brake actuators and emergency valve means for controlling the flow of fluid pressure from one of the reservoirs to the brake actuators including pressure responsive means for establishing a connection between said reservoirs in one direction and for actuating said emergency valve in response to a pressure differential between said reservoirs, and means for preventing the occurrence of said pressure differential between said reservoirs including valvular means for establishing a separate connection between said reservoirs when the pressure in one of said reservoirs exceeds a predetermined value including valvular means responsive to the pressure in the said one reservoir.

4. In a fluid pressure brake system for a vehicle having brake actuators, a pair of fluid pressure reservoirs, means including a manually controlled valve for supplying fluid pressure from one of said reservoirs to said brake actuators, emergency valve means operable in response to a pressure differential between said reservoirs for establishing a connection between said one reservoir and the brake actuators independently of the operation of said manually controlled valvular means, and means for preventing the occurrence of said pressure differential when the pressure in said reservoirs exceeds a predetermined value including valvular means operable in response to the pressure in one of said reservoirs for connecting said reservoirs.

5. A fluid pressure brake system for a tractor trailer train including main and auxiliary tractor reservoirs, a brake actuator on the tractor, manually controlled valvular means for controlling the flow of fluid pressure from the auxiliary reservoir to the tractor brake actuator, a fluid pressure reservoir on the trailer, a brake actuator on the trailer, means carried by the trailer and controlled by said manually controlled valvular means for controlling the flow of fluid pressure from the trailer reservoir to the trailer brake actuator, means including an emergency valve on the tractor for establishing a connection between the auxiliary reservoir and the tractor brake actuator independently of the operation of said manually controlled means, an emergency valve on the trailer for establishing a connection between the trailer reservoir and trailer brake actuator independently of the operation of said manually controlled means, said emergency valves including means operable for establishing a one-way connection between said main reservoir and said auxiliary reservoir and between said main reservoir and said trailer reservoir when the pressure in the main reservoir exceeds that in the other reservoirs including a pressure responsive member in each of the emergency valves and operable when the pressure in the main reservoir is less than that in the other reservoirs for operating said emergency valves to supply fluid pressure from said auxiliary reservoir and trailer reservoir to the tractor brake and trailer brake actuators respectively, and means for preventing the operation of said tractor emergency valve when said auxiliary reservoir pressure exceeds a predetermined value including valvular means responsive to the pressure in said auxiliary reservoir for establishing a separate connection between the auxiliary reservoir and the main reservoir.

6. A fluid pressure brake system for a tractor trailer train, including a fluid pressure reservoir and a fluid pressure brake actuator on each vehicle, manually controlled valvular means for controlling the flow of fluid pressure from said reservoirs to said actuators, a main reservoir on the tractor, means for supplying fluid pressure from said main reservoir to said tractor and trailer reservoirs including a feed line, emergency valve mechanisms on each vehicle operable for supplying fluid pressure respectively from the auxiliary reservoir and from the trailer reservoir to the corresponding brake actuators independently of the operation of said manually controlled valvular means, pressure responsive members associated with said emergency valves and responsive to a drop in pressure in said feed line for actuating said valves for controlling the supply of fluid pressure to the tractor and trailer brake actuators, and means including a valve for connecting the two tractor reservoirs for equalizing the pressure therein and preventing a drop in pressure in the feed line from actuating the pressure responsive member of the tractor emergency valve until the pressure in said feed line drops below a predetermined value.

7. A vehicle fluid pressure brake system having a brake actuator, a reservoir, means including a manually operable valve for controlling the flow of fluid pressure from said reservoir to said brake actuator, an auxiliary fluid pressure reservoir, means including a fluid pressure responsive valve for connecting said auxiliary reservoir with said brake actuator independently of the operation of said manually controlled valve when the pressure in said first said named reservoir is less than that in the second reservoir, and means responsive to the pressure in one of said reservoirs in excess of a predetermined value for establishing a connection between said reservoirs and preventing the operation of said pressure responsive valve.

8. A fluid pressure brake system including a main reservoir, a brake actuator, manually controlled valvular means for controlling the flow of fluid pressure from said main reservoir to said brake actuator, an auxiliary reservoir for supplying fluid pressure to said brake actuator, an emergency valve for controlling the connection between said auxiliary reservoir and said brake actuator, a pressure responsive member for controlling the operation of said valve, means for supplying fluid pressure from both of said reservoirs to said fluid pressure responsive member for controlling the actuation of said emergency valve thereby, said means including conduits from both of said reservoirs for supplying fluid pressure therefrom directly to said pressure responsive member, and means responsive to a predetermined pressure in one of said conduits for establishing a connection therebetween and maintaining equal pressure therein.

9. A fluid pressure brake system for a tractor trailer train including a brake actuator on the tractor, a brake actuator on the trailer, a reservoir on each vehicle for supplying fluid pressure to said actuators, means including a tractor carried manually operable valve for controlling the supply of fluid pressure from said rseervoirs to said brake actuators on the tractor and trailer respectively, a main reservoir on the tractor for supplying fluid pressure to said manually operable valve and to said tractor and trailer reservoirs, emergency valve mechanisms on the tractor and trailer having fluid pressure responsive devices associated therewith for controlling the flow of fluid pressure from said first named tractor and trailer reservoirs to the corresponding brake actuators, and means including a valve on the tractor responsive to the pressure in one of the tractor carried reservoirs and conduits associated therewith for directly connecting the tractor reservoir, the main reservoir and the pressure responsive member on the trailer carried emergency valve with the pressure responsive member of the corresponding tractor carried valve, when the pressure in the tractor reservoirs exceeds a predetermined value.

10. The combination with a fluid pressure brake system having a reservoir, a brake actuator, and manually controlled valvular means for controlling the flow of fluid pressure from said reservoir to said brake actuator, of means for supplying fluid pressure to said reservoir, valvular means operable on failure of said supplying means for effecting a connection between said reservoir and said brake actuator independently of the operation of said manually controlled means, and means for automatically effecting a direct connection between said reservoir and supply means for rendering said second named valvular means ineffective to establish a connection between said reservoir and brake actuator on failure of said supply means when the pressure in said reservoir exceeds a predetermined value.

11. The combination with a fluid pressure brake system having a source of fluid pressure, a brake actuator, a fluid pressure reservoir, and operator controlled valvular means for controlling the flow of fluid pressure from said reservoir to said actuator, of an emergency valve for controlling the flow of fluid pressure from the reservoir to the actuator including means responsive to the flow of fluid pressure in one direction between the source and the reservoir for establishing a connection therebetween and responsive to the flow of fluid pressure in the opposite direction between said reservoir and source for establishing a connection between the reservoir and actuator, and means for automatically establishing a separate connection between the reservoir and source for preventing the operation of said pressure responsive means to actuate the emergency valve when the pressure in said reservoir exceeds a predetermined value.

12. The combination with a fluid pressure brake system having a source of fluid pressure and a fluid pressure reservoir, a fluid pressure brake actuator, and operator controlled valvular means for controlling the flow of fluid pressure from the source to the actuator, of a connection between the source and the reservoir for supplying fluid pressure to the latter, emergency valve means operable in response to a reduction of pressure at said source for connecting the reservoir with the brake actuator and for preventing the flow of fluid pressure from the reservoir to the source, and means for preventing the operation of said emergency valve means in response to a drop in pressure at said source including valvular means for permitting the flow of fluid pressure from the reservoir to the source when the pressure in the reservoir exceeds a predetermined value.

13. In a fluid pressure brake system for a tractor trailer train having a pair of reservoirs on the tractor, a brake actuator on the tractor, a reservoir on the trailer, a brake actuator on the trailer, a connection for supplying fluid pressure from the first tractor reservoir to the second tractor reservoir and to the trailer reservoir, operator controlled valvular means for controlling the flow of fluid pressure from said reservoirs to said actuators on the tractor and trailer respectively, emergency valve means on the trailer responsive at all times to the pressure differential between the trailer reservoir and the first named tractor reservoir for connecting the trailer reservoir with the trailer brake actuator, and means including an emergency valve on the tractor for connecting said second tractor reservoir with the tractor brake actuator in response to the pressure differential between the second and first named tractor reservoirs when the pressure in one of the tractor reservoirs is less than a predetermined amount.

14. In a fluid pressure brake system for a tractor trailer train, a pair of reservoirs on the tractor, a brake actuator on the tractor, a fluid pressure reservoir on the trailer, a brake actuator on the trailer, operator controlled valvular means carried by the tractor and trailer for controlling the flow of fluid pressure from one tractor reservoir and from said trailer reservoir to the tractor and trailer brake actuators respectively, means for supplying fluid pressure from the second tractor reservoir to the first tractor reservoir and trailer reservoir respectively, means carried by the trailer and responsive to a failure in said supplying means for the trailer reservoir for connecting the latter with the trailer brake actuator, auxiliary means for effecting a connection between the first and second tractor reservoirs, and valvular means carried by the tractor for establishing a connection between the second named tractor reservoir and the tractor brake actuator when said first connection is ineffective.

15. The combination with an emergency brake system having main and auxiliary reservoirs, means for connecting said reservoirs, a brake actuator, and valvular means operable in response to a pressure differential between said reservoirs for connecting said auxiliary reservoir with said brake actuator, of independent means for establishing a connection between said reservoirs when the pressure in one of the reservoirs exceeds a predetermined value for preventing the occurrence of said pressure differential and rendering said valvular means ineffective.

16. The combination in a fluid pressure brake system having a plurality of brake actuators, a main fluid pressure reservoir, an auxiliary reservoir for supplying fluid pressure to each of said actuators respectively, means for connecting said main and auxiliary reservoirs, and fluid pressure operated valvular means associated with each of said auxiliary reservoirs and brake actuators for establishing a connection therebetween in response to a pressure differential between the auxiliary and main reservoirs, of means for normally subjecting all of said valvular means to said pressure differential, and means for establishing a separate connection between the main reservoir and one of the auxiliary reservoirs when the pressure in the latter exceeds a predetermined value.

17. A fluid brake system for a vehicle train having a tractor and a trailer, brakes on the tractor, brakes on the trailer, a source of fluid pressure on the tractor, a reservoir on the tractor and trailer operatively connected with the source, means for applying the brakes in service, means responsive to a predetermined reduction in pressure of said source for applying the tractor and trailer brakes in emergency, and means including a second connection between the source and the tractor reservoir and having a pressure responsive valve therein for delaying emergency application of the tractor brakes until after initiation of emergency application of the trailer brakes when the pressure in the tractor reservoir exceeds a predetermined value.

DAYTON H. ROBINSON.